(12) United States Patent
Morini et al.

(10) Patent No.: US 7,879,959 B2
(45) Date of Patent: Feb. 1, 2011

(54) CATALYST COMPONENTS FOR THE POLYMERIZATION OF OLEFINS

(75) Inventors: Giampiero Morini, Padua (IT); Isabella Camurati, Ferrara (IT); Tiziano Dall'Occo, Ferrara (IT); Dario Liguori, Forino (IT); Gianni Vitale, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 203 days.

(21) Appl. No.: 11/887,528

(22) PCT Filed: Mar. 15, 2006

(86) PCT No.: PCT/EP2006/060738
§ 371 (c)(1), (2), (4) Date: Sep. 28, 2007

(87) PCT Pub. No.: WO2006/103171
PCT Pub. Date: Oct. 5, 2006

(65) Prior Publication Data
US 2009/0209714 A1    Aug. 20, 2009

Related U.S. Application Data

(60) Provisional application No. 60/667,252, filed on Apr. 1, 2005.

(30) Foreign Application Priority Data

Mar. 30, 2005  (EP) ................... 05102483

(51) Int. Cl.
*C08F 4/50*  (2006.01)
(52) U.S. Cl. .................................. 526/124.3
(58) Field of Classification Search ............... 526/124.3
See application file for complete search history.

(56) References Cited

U.S. PATENT DOCUMENTS

| | | | |
|---|---|---|---|
| 4,220,554 | A | 9/1980 | Scatá et al. |
| 5,118,768 | A | 6/1992 | Job et al. |
| 5,387,749 | A | 2/1995 | Govoni et al. |
| 5,726,261 | A | 3/1998 | Sacchetti et al. |
| 5,733,987 | A | 3/1998 | Covezzi et al. |
| 6,228,956 | B1 | 5/2001 | Covezzi et al. |
| 6,544,920 | B1 | 4/2003 | Pennini et al. |
| 2009/0036298 | A1 | 2/2009 | Morini et al. |
| 2009/0054608 | A1 | 2/2009 | Morini et al. |

FOREIGN PATENT DOCUMENTS

| | | |
|---|---|---|
| DE | 3435389 | 4/1986 |
| EP | 301894 | 2/1989 |
| EP | 397122 | 11/1990 |
| EP | 423786 | 4/1991 |
| EP | 444606 | 9/1991 |
| EP | 0 553 806 | * 1/1993 |
| EP | 553805 | 8/1993 |
| WO | 92/21706 | 12/1992 |
| WO | 93/03078 | 2/1993 |
| WO | 2006/103170 | 10/2006 |
| WO | 2006/103172 | 10/2006 |

OTHER PUBLICATIONS

Young-tae Jeong, "Propene polymerization with $Mg(OEt)_2$-supported $TiCl_4$ catalyst, 1," *Makromol. Chem.*, vol. 191, p. 1487-1496 (1990) XP000162127.

T. Garoff et al., "Decrease in activity caused by hydrogen in Ziegler-Natta ethene polymerisation," *European Polymer Journal*, vol. 38, p. 121-132 (2002) XP004308066.

V. K. Gupta et al., "Studies on magnesium dichloride-2,2-dimethoxypropane-titanium tetrachloride catalyst system for propylene polymerization," *Polymer*, vol. 37(8), p. 1399-1403 (1996) XP004069331.

D-H Lee et al., "Propylene Polymerization with $Mg(OEt)_2$/Benzoyl Chloride/$TiCl_4$-Trimethyl Aluminum/External Donor Catalyst Systems," *Journal of Applied Polymer Science*, vol. 47(8), p. 1449-1461 (1993) XP000451876.

* cited by examiner

*Primary Examiner*—Ling-Siu Choi
*Assistant Examiner*—Sonya Wright
(74) *Attorney, Agent, or Firm*—Jonathan L. Schuchardt; Jarrod N. Raphael

(57) ABSTRACT

Catalyst components for the (co)polymerization of ethylene comprising Ti, Mg, halogen, ORI groups, where RI is a C1-C12 hydrocarbon group optionally containing heteroatoms, having ORI/Ti molar ratio in the range 0.1-1.5, a Mg/Ti molar ratio of less than 8, an amount of titanium, with respect to the total weight of said solid catalyst component, higher than 4% by weight characterized by a specific SS-NMR pattern are particularly useful for preparing narrow MWD crystalline ethylene polymers.

7 Claims, No Drawings

CATALYST COMPONENTS FOR THE POLYMERIZATION OF OLEFINS

The present invention relates to catalysts components for the polymerization of ethylene and its mixtures with olefins CH2=CHR, wherein R is an alkyl, cycloalkyl or aryl radical having 1-12 carbon atoms, comprising Ti, Mg, halogen, $OR^I$ groups in a specific ratio, which can be obtained by reacting under specific conditions a titanium compound having at least a Ti—Cl bond with a particular precursor. The catalyst components of the invention are suitably used in (co)polymerization processes of ethylene to prepare, in high yields, especially crystalline polymers having medium-narrow Molecular Weight Distribution (MWD). The MWD is an important characteristic of ethylene polymers in that it affects both the Theological behavior, and therefore the processability, and the final mechanical properties. In particular, in the case of LLDPE, polymers with narrow MWD are suitable for films and injection molding in that deformation and shrinkage problems in the manufactured article are minimized. The width of the molecular weight distribution for the ethylene polymers is generally expressed as melt flow ratio F/E, which is the ratio between the melt index measured by a load of 21.6 Kg (melt index F) and that measured with a load of 2.16 Kg (melt index E). The measurements of melt index are carried out according to ASTM D-1238 and at 190° C. A catalyst component for preparing ethylene (co)polymers having narrow MWD is described in the European patent application EP-A-553805. The catalyst, comprising Ti, Mg, halogen, $OR^I$ groups is characterized by a ratio OR/Ti of at least 0.5, by a porosity (determined with mercury porosimeter) of from 0.35 to 0.7 which furthermore has a specific pore distribution. Said catalyst is obtained by a rather long process which comprises the preparation of a $MgCl_2$-alcohol adduct having about 3 moles of alcohol which is first thermally dealcoholated up to an intermediate alcohol content and then chemically dealcoholated up to an almost complete extent. The so created porous precursor is then reacted with a titanium alkoxy compound in the presence of a halogenating agent and, optionally, of a reducing agent. The catalyst so obtained is able to produce ethylene (co)polymers with a narrow MWD but the polymerization activities are low. Catalysts that are the product of a somewhat simpler process are described in U.S. Pat. No. 4,220,554. They are obtained by reacting a large excess of $TiCl_4$ with catalyst precursors of general formula $MgCl_n(OR)_{2-n}$, in the presence of a internal electron donor compound at high temperatures (120° C.). The hydrogen response and the activity of the final catalyst component however, is not satisfactory.

In EP 301 894 a catalyst comprising Ti, Mg, halogen, OR groups (R is an aliphatic, aromatic or cycloaliphatic hydrocarbon radical) in which the Mg/Ti molar ratio is from 0.5 to 50 and the OR/Ti is from 1.5 to 5, is used for the preparation of amorphous ethylene copolymers. All the examples are directed to the production of amorphous copolymers and terpolymers with no indication about the suitability for the production of crystalline ethylene polymers with medium-narrow molecular weight distribution.

It is therefore still felt the need of a catalyst component suited to form a catalyst system showing a good balance of polymerization activity, ability to form ethylene polymers with narrow MWD and good hydrogen response.

The applicant has now found that the above needs are satisfied by catalyst components characterized by certain chemical features and by a specific pattern when analyzed through the solid state NMR (SS-NMR). In particular, said solid catalyst components comprise Ti, Mg, halogen, $OR^I$ groups, where $R^I$ is a C1-C12 hydrocarbon group optionally containing heteroatoms, having $OR^I$/Ti molar ratio in the range 0.1-1.5, a Mg/Ti molar ratio of less than 8, an amount of titanium, with respect to the total weight of said solid catalyst component, higher than 4% by weight, and showing in the pattern of the SS-NMR recorded under the conditions set forth below one or more signals (A) having a maximum in the region 60-75 (ppm) and one or more signals (B) having a maximum in the region 78-108 (ppm) such that the ratio $I^A/I^B$, in which $I^A$ is the integral of the signals having the maximum in the region between 60 and 75 ppm and $I^B$ is the integral of the signals having the maximum in the region between 78 and 108 ppm, is higher than 0.8.

Preferably, the ratio $I^A/I^B$ is higher than 1 and more preferably in the range 1-10. In particular cases, the ratio $I^A/I^B$ can be preferably higher than 10.

In a preferred aspect the amount of titanium, with respect to the total weight of said solid catalyst component, is higher than 5% and preferably higher than 6% by wt.

Moreover, said $OR^I$/Ti molar ratio is preferably higher than 0.3 and more preferably higher than 0.5. In a still more preferred embodiment the said ratio is higher than 0.7 and comprised in the range 0.8-1.4.

The applicant has also found that in an alternative way, the above mentioned catalyst components comprising Ti, Mg, halogen, $OR^I$ groups, where $R^I$ is a C1-C12 hydrocarbon group optionally containing heteroatoms, a $OR^I$/Ti molar ratio in the range 0.1-1.5, a Mg/Ti molar ratio of less than 8 and an amount of titanium, with respect to the total weight of said solid catalyst component, higher than 4% by weight, can be characterized as being obtainable by reacting a titanium compound having at least a Ti—Cl bond with a catalyst precursor of formula $MgCl_n(OR^I)_{2-n}$, where n is from 0.5 to 1.5 and $R^I$ has the meaning given above.

In a preferred embodiment of the invention $R^I$ is a C1-C8 hydrocarbon group selected from alkyl groups. Among them, particularly preferred are methyl, ethyl, n-propyl, n-butyl, i-butyl, and tert-butyl.

Moreover, said $OR^I$/Ti molar ratio is preferably higher than 0.3 and more preferably higher than 0.5. In a still more preferred embodiment the said ratio is higher than 0.7 and comprised in the range 0.8-1.4.

Among the titanium compounds containing at least one Ti-halogen bond, those having the formula $Ti(OR^I)_{p-y}Cl_y$, wherein $R^I$ has the meaning given above, p is the titanium valence and y is a number comprised between 1 and p, are preferred. Particularly preferred are the titanium compounds in which y is 3 or 4 and $TiCl_4$ is especially preferred.

Among the catalyst precursors particularly preferred are those in which $R^I$ is selected among a C1-C8 hydrocarbon group, preferably ethyl, and n ranges from 0.6 to 1.4, in particular from 0.7 to 1.3 and especially from 0.8 to 1.2. The said catalyst precursors can be generated by exchange reaction between organometallic compounds of formula $Cl_m$-$MgR_{2-m}$, where m is from 0.5 to 1.5, and R is a hydrocarbon group, with an appropriate $OR^I$ group source. The $OR^I$ sources are for example $R^I OH$ alcohols or, preferably, a silicon compound of formula $(R^I O)_r SiR_{4-r}$ where r is from 1 to 4 and $R^I$ has the meaning given above. In turn, as generally known in the art, organometallic compounds of formula $Cl_m$-$MgR_{2-m}$ can be obtained by the reaction between Mg metal and an organic chloride RCl, in which R is as defined above, optionally in the presence of suitable promoters. Preferably, the formation of $Cl_m MgR_{2-m}$ and the further exchange with the $OR^I$ source takes place in one single step. The reaction can be carried out in a liquid inert medium such as hydrocarbon that is liquid at room temperature. Usually, upon a substantial amount of exchange with the OR source occurred, the catalyst precursors precipitate and can be easily isolated.

As mentioned above the reaction between titanium compound having at least a Ti—Cl bond and the catalyst precursor should be carried out under conditions such that the reaction product has a final $OR^I$/Ti molar ratio comprised among 0.1 and 1.5. It is within the ordinary knowledge of the skilled in the art that there are several ways of obtaining the same results.

According to one preferred embodiment, the catalyst component is obtained by reacting the catalyst precursor with a titanium compound, preferably $TiCl_4$, used in amounts such the molar ratio between the titanium compound and the $OR^I$ groups of the catalyst precursor is higher than 4. The ratio can be higher than 6 and even higher than 10. In this embodiment the reaction temperature is not particularly critical and is preferably kept at values ranging from 40 to 150° C. and preferably in the range 70 to 140° C. When using sufficient excess of liquid titanium compound, preferably $TiCl_4$, a liquid inert medium can be omitted as the titanium compound acts simultaneously as halogenating agent and reaction medium. However, if desired, a liquid inert medium can be used also in this embodiment. Preferred inert media are liquid aliphatic or aromatic hydrocarbons, optionally chlorinated, and among them those having from 3 to 20 carbon atoms. Especially preferred are propane, n-butane, n-pentane, n-hexane, n-heptane, benzene, toluene and isomers thereof. Mixture of two or more of said hydrocarbons can be used. Due to the halogenating capability of the titanium compound, upon reaction with the catalyst precursor a certain amount of magnesium chloride can be formed.

According to another preferred embodiment the titanium compound is used in amounts such the molar ratio between the titanium compound and the $OR^I$ groups of the catalyst precursor can be lower than 4. Under these conditions the temperature becomes critical and it is preferably kept at values higher than 100° C. even more preferably in the presence of a liquid medium such as those disclosed above.

The solid catalyst components according to the present invention are converted into catalysts for the polymerization of olefins by reacting them with organoaluminum compounds according to known methods.

In particular, it is an object of the present invention a catalyst for the polymerization of olefins $CH_2$=HR, in which R is hydrogen or a hydrocarbyl radical with 1-12 carbon atoms, comprising the product of the reaction between:

(a) a solid catalyst component as described above,
(b) an alkylaluminum compound and, optionally,
(c) an external electron donor compound.

The alkyl-Al compound can be preferably selected from the trialkyl aluminum compounds such as for example trimethylaluminum (TMA), triethylaluminum (TEA), triisobutylaluminum (TIBA)), tri-n-butylaluminum, tri-n-hexylaluminum, tri-n-octylaluminum. Also alkylaluminum halides and in particular alkylaluminum chlorides such as diethylaluminum chloride (DEAC), diisobutylaluminum chloride, Al-sesquichloride and dimethylaluminum chloride (DMAC) can be used. It is also possible to use, and in certain cases preferred, mixtures of trialkylaluminum's with alkylaluminum halides. Among them mixtures between TEA and DEAC are particularly preferred.

The above mentioned components (a)-(c) can be fed separately into the reactor where, under the polymerization conditions can exploit their activity.

The so formed catalyst system can be used directly in the main polymerization process or alternatively, it can be pre-polymerized beforehand. A pre-polymerization step is usually preferred when the main polymerization process is carried out in the gas phase. The prepolymerization can be carried out with any of the olefins $CH_2$=CHR, where R is H or a C1-C10 hydrocarbon group. In particular, it is especially preferred to pre-polymerize ethylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred Examples of gas-phase processes wherein it is possible to use the catalysts of the invention are described in WO 92/21706, U.S. Pat. No. 5,733,987 and WO 93/03078. These processes comprise a pre-contact step of the catalyst components, a pre-polymerization step and a gas phase polymerization step in one or more reactors in a series of fluidized or mechanically stirred bed. In a particular embodiment, the gas-phase process can be suitably carried out according to the following steps:

(i) pre-polymerizing with one or more olefins of formula $CH_2$=CHR, where R is H or a C1-C10 hydrocarbon group, up to forming amounts of polymer from about 0.1 up to about 1000 g per gram of solid catalyst component (a); and (ii) polymerizing in the gas-phase ethylene, or mixtures thereof with α-olefins $CH_2$=CHR in which R is a hydrocarbon radical having 1-10 carbon atoms, in one or more fluidized or mechanically stirred bed reactors, in the presence of the product coming from (i).

However, the catalysts of the invention are particularly suited for slurry polymerization in an inert medium such as propane, butane, pentane, hexane, heptane and mixtures thereof.

As already mentioned, the catalysts of the present invention are suitable for preparing ethylene polymers having the desired balance of catalyst activity, hydrogen response and suitable MWD. In particular it is possible to obtain a very narrow molecular weight distribution which is characterized by a F/E ratio of lower than 40, preferably lower than 35 and in some cases lower than 30. When the ethylene is polymerized together with a minor amount of an alpha olefin as comonomer, selected from propylene, butene-1, hexene-1 and octene-1, a linear low density polyethylene having a density lower than 0.940 $g/cm^3$ with a very good quality is obtained which is indicated by the low ratio among weight of xilene soluble fraction and weight of comonomer in the chain. In addition, the catalyst of the invention also show a very good hydrogen response, i.e., the capability of producing low molecular weight polymers in dependence of a given content of molecular weight regulator (usually hydrogen) in the polymerization system. This feature is particularly useful when polymers with a bimodal molecular weight distribution are to be prepared in sequential polymerization steps. In this case, it is suitable to have a catalyst with a good hydrogen response because low molecular weight polymers are produced with a minor amount of Mw regulator and, as a consequence, with a higher activity.

Non limitative examples of other polymers that can be prepared with the catalyst of the invention are very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%; high density ethylene polymers (HDPE, having a density higher than 0.940 g/cm$^3$), comprising ethylene homopolymers and copolymers of ethylene with alpha-olefins having 3-12 carbon atoms; elastomeric copolymers of ethylene and propylene and elastomeric terpolymers of ethylene and propylene with smaller proportions of a diene having a content by weight of units derived from ethylene of between about 30 and 70% The following examples are given in order to further describe the present invention in a non-limiting manner.

Characterization

The properties are determined according to the following methods:

Melt Index: measured at 190° C. according to ASTM D-1238 condition "E" (load of 2.16 Kg), "P" (load of 5.0 Kg) and "F" (load of 21.6 Kg);

Fraction soluble in xylene. The solubility in xylene at 25° C. was determined according to the following method: About 2.5 g of polymer and 250 cm$^3$ of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content

1-Butene or α-olefins were determined via Infrared Spectrometry.

Effective density: ASTM-D 1505

Thermal analysis: Calorimetric measurements were performed by using a differential scanning calorimeter DSC Perkin-Elmer. The instrument is calibrated with indium and tin standards. The weighted sample (5-10 mg), obtained from the Melt Index determination, was sealed into aluminum pans, thermostatted at 5° C. for 3 minutes, heated to 200° C. at 20° C./min and kept at that temperature for a time long enough (5 minutes) to allow a complete melting of all the crystallites. Successively, after cooling at 20° C./min to −20° C., the peak temperature was assumed as crystallization temperature (Tc). After standing 5 minutes at 0° C., the sample was heated to 200° C. at a rate of 20° C./min. In this second heating run, the peak temperature was assumed as melting temperature (Tm) and the area as the global melting hentalpy (ΔH).

Determination of Mg, Ti: has been carried out via inductively coupled plasma emission spectroscopy (ICP).

Determination of Cl: has been carried out via potentiometric tritration.

Determination of alkoxides (as ROH): via Gas-Chromatography analysis after hydrolysis of the catalyst.

Solid State NMR analysis. Solid state $^{13}$C-NMR spectra were recorded on a Bruker DPX-200 spectrometer operating at 50.32 MHz in the Fourier transform mode. Samples were measured at room temperature in a 7 mm ZrO$_2$ rotor using a spinning speed of 4 KHz. Transients were accumulated using the cross polarization magic angle spinning technique (CP-MAS) with a recycle delay of 5 sec. and a contact time of 1 msec. All NMR experiments employed a proton decoupling field of sufficient magnitude to ensure full decoupling over the entire spectral width.

The rotors were prepared under nitrogen atmosphere.

Crystalline polyethylene in orthorhombic phase was taken as an external reference at 32.85 ppm from tetramethylsilane (TMS)

$I_A$ is defined as the integral of the signals having the maximum in the region between 60 and 75 ppm.

$I_B$ is defined as the integral of the signals having the maximum in the region between 78 and 108 ppm.

Ethylene Polymerization: General Procedure.

A 4.5 liter stainless-steel autoclave equipped with a stirrer, temperature and pressure indicator, feeding line for hexane, ethylene, and hydrogen, was used and purified by fluxing pure nitrogen at 70° C. for 60 minutes. Then, 1550 cm$^3$ of hexane containing 4.9 cm$^3$ of 10% by wt/vol TEA/hexane solution, was introduced at a temperature of 30° C. under nitrogen flow. In a separate 200 cm$^3$ round bottom glass bottle were successively introduced, 50 cm$^3$ of anhydrous hexane, 1 cm$^3$ of 10% by wt/vol, TEA/hexane solution and about 0.010÷0.025 g of the solid catalyst of table 1. They were mixed together, aged 10 minutes at room temperature and introduced under nitrogen flow into the reactor. The autoclave was closed, then the temperature was raised to 85° C., ethylene (7.0 bars partial pressure) and hydrogen (partial pressure as indicated in table 2) were added.

Under continuous stirring, the total pressure was maintained at 85° C. for 120 minutes by feeding ethylene. At the end the reactor was depressurized and the temperature was dropped to 30° C. The recovered polymer was dried at 70° C. under a nitrogen flow.

EXAMPLES

All the solvent were deoxygenated, dried over LiAlH$_4$ and distilled under nitrogen atmosphere before the use.

TEA is Tris-Ethyl-Aluminum

TiBA is Tris-isoButyl-Aluminum

General Preparation of the Precursor

The synthesis of the precursor was performed as described in Example 1 of U.S. Pat. No. 4,220,554. The so obtained support has the following composition:

Mg, 20.2 wt. %
Cl, 29.8 wt %
EtO groups 41.5 wt. %

Example 1

Into a 500 cm3 four-necked round flask, purged with nitrogen, 280 cm$^3$ of decane and 17.7 g (147 mmol of Mg) of the support previously prepared, were introduced at 25° C. Then, at the same temperature, 103 mmol of TiCl$_4$ were added under stirring. The temperature was raised to 120° C. in 1 h and maintained for 2 hours. Then, the stirring was discontinued, the solid product was allowed to settle for 30 minutes and the supernatant liquid was siphoned off.

The solid was washed twice with anhydrous heptane (2×100 cm$^3$) at 50° C. and three times at 25° C. Finally, the solid was dried under vacuum and analyzed. The results are reported in table 1. The catalyst was used in the polymerization of ethylene according to the general polymerization procedure under the specific conditions reported in table 2.

Example 2

In a 500 cm$^3$ four-necked round flask equipped with a mechanical stirrer and purged with nitrogen, 220 cm$^3$ of TiCl$_4$ were charged. The temperature was set at 0° C. and 15.3 g (127 mmoles. of Mg) of the solid support were slowly fed. The temperature was raised to 120° C. and the mixture was stirred for 1 hours. Then, the stirring was discontinued, the solid product was allowed to settle and the supernatant liquid was siphoned off. Said titanation procedure was repeated twice under the same conditions for 0.5 hours.

The solid was washed twice with anhydrous heptane (2×100 cm$^3$) at 40° C. and twice at 25° C., recovered, dried under vacuum and analyzed. The characteristics are collected in table 1.

The catalyst was used in the polymerization of ethylene according to the general polymerization procedure under the specific conditions reported in table 2.

Example 3

In a 800 cm$^3$ four-necked round flask equipped with a mechanical stirrer and purged with nitrogen, 600 cm$^3$ of TiCl$_4$ were charged. The temperature was set at 0° C. and 30 g (249 mg at. of Mg) of the solid support were slowly fed. The temperature was raised to 135° C. in about 90 minutes and the mixture was stirred for 2 hours. Then, the stirring was discontinued, the solid product was allowed to settle and the supernatant liquid was siphoned off. The solid was washed with anhydrous heptane (3×200 cm$^3$) at 60° C. and twice at 25° C., recovered, dried under vacuum and analyzed. The characteristics are collected in table 1. The catalyst was used in the polymerization of ethylene according to the general polymerization procedure under the specific conditions reported in table 2.

Comparative Example 1

A catalyst component was prepared according to the description of Example 2(a) of U.S. Pat. No. 4,220,554. The catalyst was used in the polymerization of ethylene according to the general polymerization procedure under the specific conditions reported in table 2.

TABLE 1

| | | Catalyst preparation | | | Catalyst composition | | | | |
|---|---|---|---|---|---|---|---|---|---|
| Ex. | solvent | Ti/Mg m·r | Temp. °C. | time h | Mg wt. % | Ti wt. % | EtOH wt. % | EtO/Ti m·r | SS-NMR $I_A/I_B$ |
| 1 | decane | 0.7 | 120 | 2 | 13.8 | 11.1 | 10.9 | 1.0 | 1.11 |
| 2 | TiCl$_4$ | 17.7 | 120 | 1/0.5/0.5 | 19.1 | 5.5 | 5.2 | 1.1 | — |
| 3 | TiCl$_4$ | 20.7 | 135 | 2 | 18.1 | 7.2 | 4.0 | 0.6 | >55 |
| Comp. | TiCl$_4$/EB | 10.2 | 120/120 | 2/2 | 21.6 | 3.2 | 3.0 | 1.0 | — |

— not determined

TABLE 2

| | Polymerization conditions | | Polymer Characterization | | | |
|---|---|---|---|---|---|---|
| Ex. | H$_2$ bar | Polymer g | Yield Kg/g$_{cat}$ | MI E g/10' | MIF/ MIP | MIF/ MIE |
| 1 | 3.00 | 400 | 20.7 | 2.5 | 10.3 | 30.9 |
| 2 | 4.00 | 550 | 26.4 | 10.40 | 10.9 | 32.5 |
| 3 | 3.00 | 484 | 32.0 | 1.8 | 10.6 | 32.5 |
| Comp. | 4.00 | 168 | 8.5 | 1.6 | 9.8 | 30.7 |

The invention claimed is:

1. A process which comprises polymerizing ethylene in the presence of hydrogen and a catalyst system comprising a catalyst component comprising Ti, Mg, halogen, and OEt groups, wherein the catalyst component has an OEt/Ti molar ratio greater than 0.5, a Mg/Ti molar ratio of less than 8, an amount of titanium, with respect to the total weight of said catalyst component, greater than 5% by weight, and shows in the pattern of the SS-NMR recorded under the conditions set forth below one or more signals (A) having a maximum in the region 60-75 (ppm) and one or more signals (B) having a maximum in the region 78-108 such that the ratio $I^A/I^B$, in which $I^A$ is the integral of the signals having the maximum in the region between 60 and 75 ppm and $I^B$ is the integral of the signals having the maximum in the region between 78 and 108 ppm, is higher than 0.8.

2. The process of claim 1 wherein the OEt/Ti molar ratio is greater than 0.6.

3. The process of claim 1 wherein the amount of titanium is greater than 6% by weight.

4. The process of claim 1 wherein the catalyst system further comprises an alkylaluminum compound and, optionally, an electron donor compound.

5. The process of claim 1 wherein the ratio $I^A/I^B$ is in the range of 1 to 10.

6. The process of claim 1 wherein the catalyst component is prepared by reacting a titanium compound having at least one Ti—Cl bond with a catalyst precursor of the formula $MgCl_n(OEt)_{2-n}$, where n is from 0.5 to 1.5.

7. The process of claim 6 wherein the titanium compound is titanium tetrachloride.

\* \* \* \* \*